C. F. FITTS.
BALLAST SPREADING ATTACHMENT FOR CARS.
APPLICATION FILED OCT. 29, 1910.
1,054,913.
Patented Mar. 4, 1913.
2 SHEETS—SHEET 1.
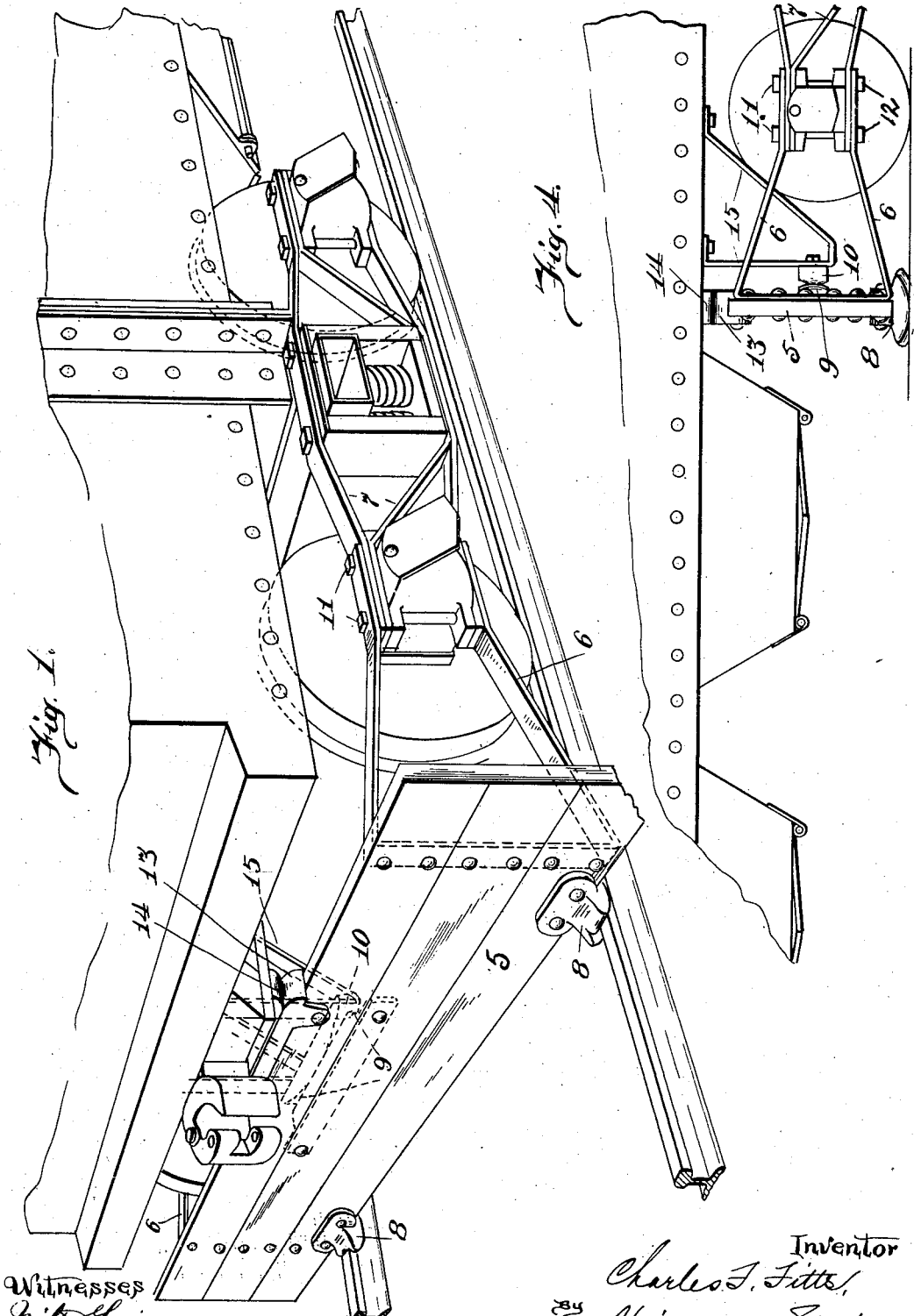

C. F. FITTS.
BALLAST SPREADING ATTACHMENT FOR CARS.
APPLICATION FILED OCT. 29, 1910.
1,054,913.
Patented Mar. 4, 1913.
2 SHEETS—SHEET 2.
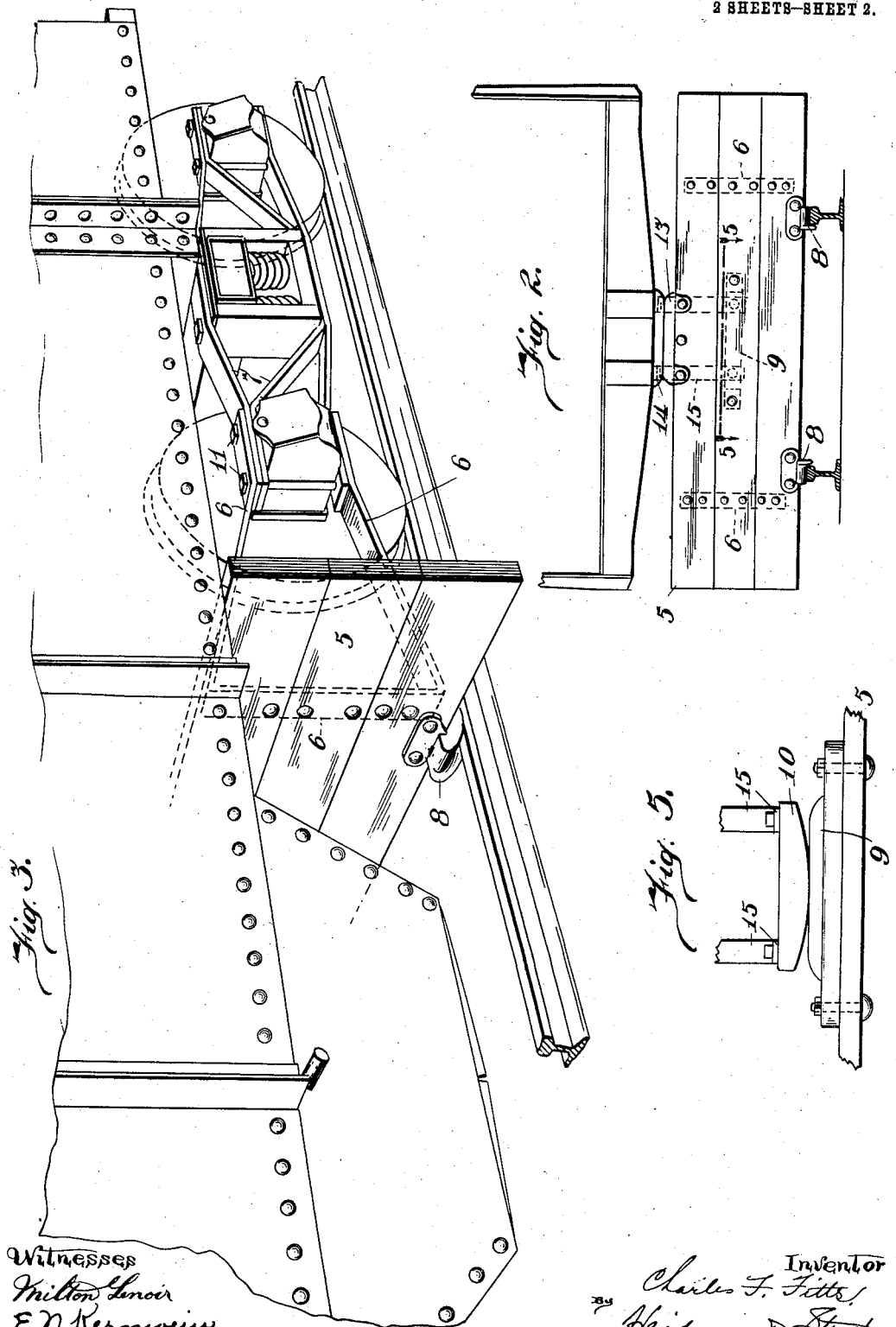

UNITED STATES PATENT OFFICE.

CHARLES F. FITTS, OF CHICAGO, ILLINOIS, ASSIGNOR TO RODGER BALLAST CAR COMPANY, OF CHICAGO, ILLINOIS, A CORPORATION OF MAINE.

BALLAST-SPREADING ATTACHMENT FOR CARS.

1,054,913.  Specification of Letters Patent.  Patented Mar. 4, 1913.

Application filed October 29, 1910. Serial No. 589,695.

*To all whom it may concern:*

Be it known that I, CHARLES F. FITTS, a citizen of the United States, and residing in Chicago, county of Cook, and State of Illinois, have invented a certain new and useful Improvement in Ballast-Spreading Attachments for Cars, of which the following is a description, reference being had to the accompanying drawings, which form a part of my specification.

The invention relates to an attachment adapted to be readily secured to a car forward of either the front or rear truck or wheels, so as to spread the ballast between the rails and also clear the rails; the attachment being so secured as to constantly maintain it in proper position on the rails when the car is going around a curve.

The object of the invention is to provide an attachment which will be guided in its lateral movements by the trucks, but at the same time be so secured that the severe strains to which the attachment is subject when encountering the unspread dirt or ballast will be transmitted to the car body and not to the trucks, as will more fully appear from the following detailed description of the accompanying drawings, wherein:—

Figure 1 is a perspective view of my improvement shown secured forward of the front wheels. Fig. 2 shows the attachment in elevation with a portion of the car frame. Fig. 3 is a perspective view of a portion of a car with my attachment shown secured beneath the car, forward of the rear wheels. Fig. 4 is a side elevation of a portion of a car with the attachment secured in place as shown in Fig. 3. Fig. 5 is a sectional view taken on the line A—A of Fig. 2, looking downwardly.

In Fig. 1 the attachment is shown secured at the front end of a car, that is, forward of the front truck or wheels. This method is employed more especially when the ordinary ballast cars or Hart convertible type of cars are used, whereby the ballast is so dumped as to "pile" entirely between the rails, so that the wheels of the rear truck will not be interfered with by the unspread ballast. The attachment comprises the vertically disposed member or boards 5, which are bolted or otherwise secured to the frames 6; the frames 6 being so formed as to provide rearwardly extending portions which are intended to be secured in any suitable manner to the truss-bars or side members 7, 7, of the truck; the frame or bracket 6 being preferably bolted above and beneath the journal-box of the front wheel as clearly shown in Fig. 1. The frame or bracket 6 is so formed as to take across the entire rear face of member 5 and thus firmly hold the composite member 5 together in proper position. The member 5 is shown composed of a number of planks or boards, but it is apparent that instead of a composite member being employed, the same may be an integral structure, which extends transversely of the car and across the rails as shown. The lower edge of member 5 is preferably provided with the rail-riding members or shoes 8, so that the weight of said member 5 will rest on the rails. The member 5 is provided with an abutting member 9 which takes against the member or bolster 10 secured to the car frame in any suitable manner, as for example by the bracket or brace 15 which is secured to the car-body or frame by bolts or otherwise. Both members 9 and 10 are preferably formed with curved abutting surfaces, so as to permit of the lateral movement of the car-body, when the wheels are going around a curve in the track and allow the abutting members to be constantly in contact. When the attachment is secured forward of the front truck, it must, of course, be so secured as not to interfere with the coupler. The bolster or member 10 must therefore extend downward from or be located below the bottom of the car-body or frame so that the attachment may be put in place beneath the coupler. The object of the members 9 and 10 is to transmit the pushing strains, caused by member 5 encountering the ballast, to the frame or body of the car; while the weight of the attachment is carried by the rails through the medium of the shoes 8; and the position of the attachment, relative to the rails, is controlled by the brackets or frames 6, as well as shoes 8, when the latter are of a type as illustrated. It is evident that the brackets 6 will compel the attachment to follow the movement of the trucks around any curves in the track.

In Fig. 3 I have shown the attachment applied to a hopper car, in front of the rear truck, as, with this type of car, the ballast when dumped spreads more or less across the rails. It is therefore necessary to apply the attachment so that the truck and wheels immediately following will not encounter the unspread ballast. This construction is identical with the construction shown in Fig. 1, except that in this case the abutting member or bolster 10 is secured beneath the car body forward of the rear truck. As in the construction previously described, the member 5 is directed in its movements by the brackets or frame 6, which will compel the attachment to follow the movements of the rear truck.

It is apparent from the construction that the attachment is very readily secured in place by merely passing the rearwardly extending portions of the brackets or frame 6 over and beneath the members 7 of the truck, securing them in place by the bolts 11, 11 and 12, 12.

In addition to the brackets or frames 6, holding the member 5 down onto the rails, the member may be provided with the plate 13 which takes beneath a member 14 which is shown secured to the coupler supporting frame in the construction illustrated in Fig. 1, and secured to the car-body in the construction illustrated in Fig. 4. It is evident from this construction that the member cannot rise up from the rails when encountering the ballast which may also wedge beneath the member 5.

Having described my invention, what I wish to secure by Letters Patent, is:—

1. A ballast spreading attachment for cars comprising a ballast engaging member adapted to ride upon the rail forward of one of the car-trucks, and means secured to the car-body whereby the member is braced and the strains transmitted to the car-body, the relation between the means and the member being such that the latter may have a horizontal rocking motion on said means independent of the lateral motion of the car-body, and means whereby said member is made to follow the movement of the car-truck.

2. A ballast spreading attachment for cars consisting of a ballast-engaging member arranged to ride upon the rails and extend transversely of the car-body, means secured to the car-body and so related to the member that the latter may have horizontal rocking movement on said means and the strains on the member transmitted to the car-body, means intermediate of said member and the car-body whereby the member is held down on the track, and means whereby the member is made to follow the horizontal movement of the car-truck.

3. A ballast spreading attachment for cars consisting of a ballast-engaging member arranged to ride upon the rails and extend transversely of the car-body, means secured to the car-body and engaging said member at a point intermediate of its ends and so related thereto that the member may have horizontal rocking movement on said means and strains transmitted to the car-body, means intermediate of the car-body and the member and having yielding engagement with said member whereby the latter is held down on the track, and means whereby said member is controlled by the horizontal movement of the car-truck.

CHARLES F. FITTS.

Witnesses:
E. N. KERNWEIN,
GEORGE HEIDMAN.